April 24, 1928.
S. E. ADAIR ET AL
1,667,300
AEROPLANE AMPLIFIER
Filed May 12, 1925
3 Sheets-Sheet 1
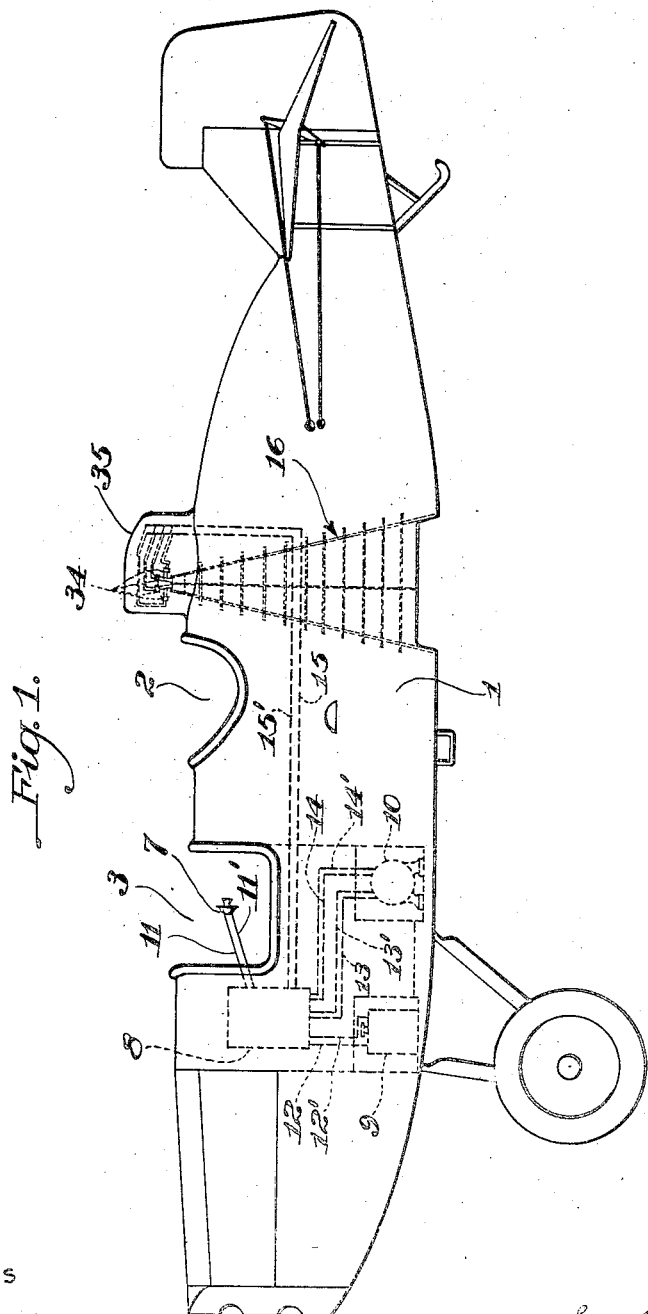
WITNESSES
INVENTORS

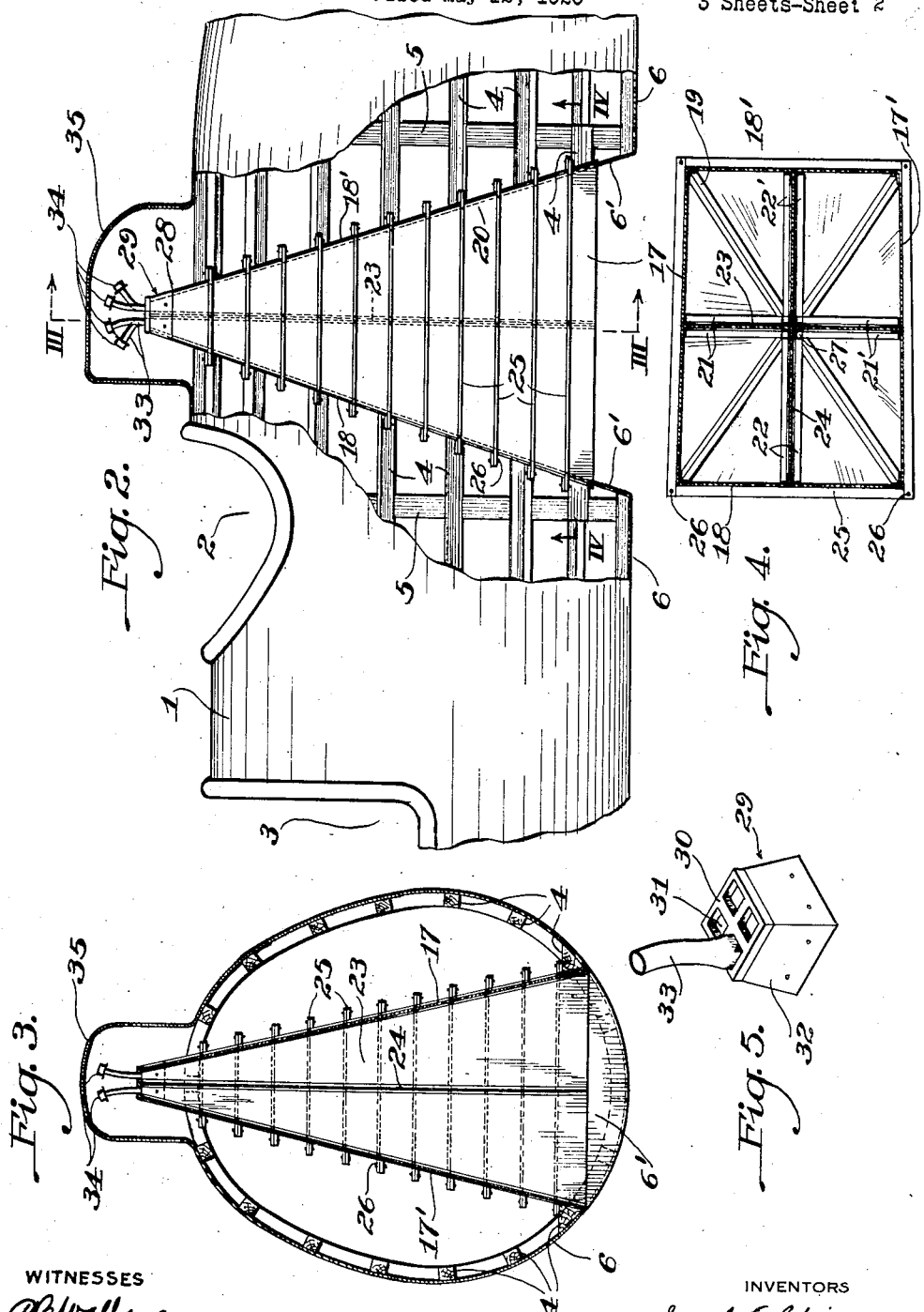

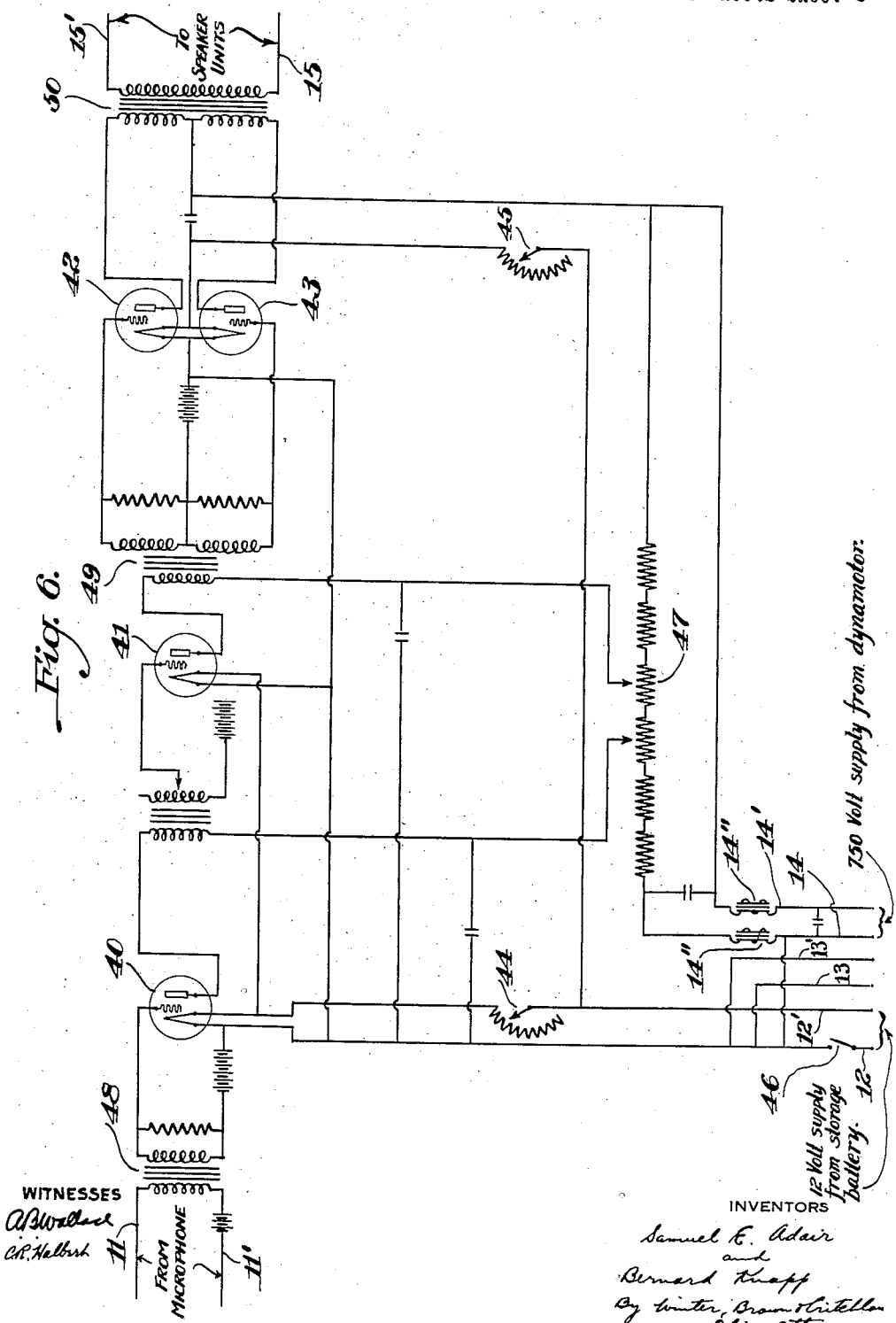

Patented Apr. 24, 1928.

1,667,300

UNITED STATES PATENT OFFICE.

SAMUEL E. ADAIR, OF CHICAGO, ILLINOIS, AND BERNARD KNAPP, OF KANSAS CITY, MISSOURI, ASSIGNORS, BY DIRECT AND MESNE ASSIGNMENTS, TO PLANE-SPEAKER CORPORATION, OF KANSAS CITY, MISSOURI, A CORPORATION OF DELAWARE.

AEROPLANE AMPLIFIER.

Application filed May 12, 1925. Serial No. 29,839.

This invention relates generally to aircraft, such as balloons, kites, dirigibles and aeroplanes, and particularly to an amplifier system carried thereby so arranged as to be adapted for effectively projecting audible sounds from the aircraft to an audience located upon the earth.

It is an object of the invention to provide an amplifier system of this character which is comparatively simple in construction, easy to install, conveniently arranged and highly effective in operation in that audible sounds of sufficient volume may be readily projected from heights of several thousand feet in a fashion enabling the same to be distinctly heard by large audiences located upon the earth and scattered over an extensive area.

Due to the restricted space available within the fuselage of an aeroplane, and the obvious objection of any needless excess weight it is also an object to provide an amplifier system which is extremely compact, which interferes to a minimum with the normal operation of the aeroplane, and which is light in weight, and in harmony with this object it is proposed to eliminate as far as practicable the employment of the otherwise large number of heavy storage batteries required to furnish the electro-motive force necessary for the actuation of the several plate circuits of the amplifier unit proper.

Another object is the provision of an amplifier horn of unique construction, conveniently and securely mounted upon the areoplane in such fashion as to effectively project the desired sounds downwardly towards an audience located upon the earth and while constituting a unitary structure for purposes of attachment to the fuselage in effect comprises a plurality of coordinated loud speaking devices to assure the required volume necessary to accomplish the intended purpose.

A further object is to mount the horn within the fuselage so as to avoid the projection of parts in an objectionable manner beyond the body thereof, and so coordinate the sides of the horn with the sheathing or covering of the fuselage adjacent the discharge end of the horn that the sheathing will not only form a substantial continuation of the horn itself, but will also serve as a seal against the ingress of air currents at this region.

A still further object is to provide a horn especially adapted for the purposes intended which is extremely sturdy in construction, which lends itself to the application of a plurality of loud speaker units assembled upon a single cap piece, surmounting the smaller end of the horn, and in which the exterior bracing or strengthening members are so arranged as to aid in suspending the horn within the body of the fuselage.

It is also an object to provide a system in which the several parts are suspended to avoid objectionable vibration thereof, and in which the exceedingly high potentials used for the operation of the plate circuits of the amplifier unit proper in order to obtain the desired output are obtained by using a dynamotor associated with a single set of comparatively light weight low potential storage batteries for supplying the filament circuits whereby the total weight of the electrical equipment is reduced to a minimum.

An additional object is to provide a sound projecting horn which is built up of a number of specially shaped parts so that it may not only be readily subdivided into a plurality of similar compartments, but cooperates with the general structure of the fuselage whereby to secure its intended mode of functioning in an extremely efficient manner.

These and other objects of the invention will more fully appear when taken in conjunction with the following description and the appended claims.

In the accompanying drawings which form part of the application, Fig. 1 is a diagrammatic view in elevation, illustrating a conveniental form of aeroplane equipped with the invention; Fig. 2 a fragmentary view on an enlarged scale, partly in elevation and partly in section, showing the method of mounting the sound projecting horn within the body of the fuselage; Fig. 3 a vertical transverse sectional view taken substantially on the line III—III of Fig. 2; Fig. 4 a horizontal sectional view taken substantially on the line IV—IV of Fig. 2, illustrating the method of dividing the body of the horn into a plurality of similar compartments as well as the method of constructing the body of the horn; Fig. 5 a fragmentary view in perspective showing the structure of the cap piece surmounting the smaller end of the horn, a number of the sound conveying tubes being removed for the purpose of clearly showing the openings which align with the reduced openings at the upper end of the several compartments; and Fig. 6 a view depicting a typical method for wiring the amplifying unit interposed between the transmitter and the electrical sound reproducing or loud speaker units.

Referring to the drawings,: 1 designates generally the fuselage of an aeroplane, equipped with a pair of cock pits 2 and 3, the former corresponding to the usual pilot's cock pit and the latter being intended for occupancy by the operator, announcer or lecturer when the amplifier system is employed for certain purposes which will hereinafter more fully appear.

The construction of the body of the fuselage 1 corresponds to types now in common use, and as illustrated, includes the customary spaced apart longerons 4, the hoops or transverse members 5, and the sheathing or outer covering 6, all in accordance with well known practice. The sheathing 6 may consist of any of the materials now used for this purpose, but sheet metal formed of a metal having a small specific gravity, for instance sheet aluminum or duralumin, is found most suitable for this purpose.

Disposed at a convenient point and preferably within the cock pit 3 is a transmitter 7 in the form of an aircraft microphone. While the particular construction of the microphone may vary, corresponding to any desirable form now upon the market, it is proposed to use a type comprising a diaphragm so arranged as to be subjected at its opposite faces to sound vibrations generally, and equipped with means for directing the voice or other sounds which are intended to be amplified and projected from the output side of the system upon but one side of the diaphragm, in this way securing an elimination of unwanted noises or sounds such as produced by the running of the engine, or otherwise, while amplifying merely those desired. For the purpose of convenience the microphone 7 is located towards the forward part of the cock pit 3 so that a speaker may readily occupy the space immediately therebehind without difficulty.

Mounted within the interior of the fuselage, in any desired manner in order to eliminate objectionable vibration of the several parts, are the amplifier proper designated at 8, the low potential electrical source in the form of a storage battery 9, and the source of high potential electrical energy in the form of a dynamotor 10, all of which may be resiliently suspended within the body of the fuselage in any approved manner and operatively connected with each other by suitable wiring, all as clearly indicated in Fig. 1 of the drawings. If desired, the amplifier unit may be enclosed in a special outer casing with sponge rubber interposed between it and the said outer casing which is then bodily suspended by the resilient bands or cables attached to the framework of the fuselage, and in some cases it may prove more satisfactory to resiliently suspend in a similar fashion the parts 8—10 connected as a unit. The electrical conductors between the microphone 7 and the amplifier unit 8 are indicated at 11, 11', those connecting the storage battery 9 with the amplifier at 12, 12', the two sets of conductors between the dynamotor 10 and the amplifier at 13, 13', and 14, 14', respectively, and the conductors for the output of the amplifier leading to the several loud speaker units of the horn at 15, 15'.

The sound-projecting horn through which the desired sounds are projected downwardly from the aeroplane is indicated generally at 16, is bodily suspended within the body of the fuselage with its longitudinal axis approximately vertically disposed, and is preferably located slightly to the rear of the cock pit 2.

The sound-projecting horn is pyramidal or conical in shape, tapering from its reduced upper end to an enlarged lower discharge end, and as clearly shown in Fig. 4 of the drawings, is substantially rectangular in horizontal cross section, decreasing slightly in width towards the rear of the plane so as to correspond to the taper of the body of the fuselage. The horn is built up of a number of specially shaped parts comprising four trapezoidal side walls 17, 17', 18, 18', rigidly secured at their adjacent edges forming what might be conveniently termed the four corners of the body, the body being open throughout its entire extent from end to end. For locking the several side walls together, a metallic angle bar such as indicated at 19 is placed upon the interior of the body and disposed within each of the corners thereof, and a similar angle bar such as indicated at 20 placed exteriorly of the body in embracing relation with each of the four corners of the body. These angle bars may be attached to the body by suitable screws disposed at convenient intervals throughout their lengths.

Besides the angles 19, 20, a plurality of similar angle bars arranged in pairs such as shown at 21, 21', 22 and 22' are also attached upon the interior of the body for the purpose of securing the transversely extending partitions 23 and 24 which are employed for subdividing the interior of the horn into a plurality of similar compartments. The arrangements of the several angle bars and the partitions will be clear from an inspection of Fig. 4 of the drawings. Surrounding the exterior of the horn and spaced at convenient intervals throughout its entire length are a plurality of strengthening ribs such as indicated at 25. These ribs are made up of sections which extend along one of the side walls of the body, the sections projecting at their opposite ends slightly beyond the body and are connected together at their overlapping portions such as indicated at 26. These sections besides being connected at 26, as by bolting, are also directly fastened to the side walls of the horn by suitable screws or by gluing, or both, as is found desirable.

The transverse partitions 23 and 24 subdivide the interior of the body into similarly shaped compartments, each of which terminates in an opening 27 of reduced size forming the inlet to the compartment at the upper end of the horn. The angle members 20 terminates a slight distance short of the smaller end of the horn, or at a point corresponding to that indicated by the reference numeral 28, so as the better to neatly receive a cap-piece 29 which surmounts the reduced end of the horn.

The construction of this cap-piece is best shown in Fig. 5 of the drawings while its mounting upon the horn is clearly shown in Fig. 2 thereof. This cap-piece consists of a plate 30 having a plurality of apertures 31, corresponding in number to the number of compartments in the horn, to which are attached a plurality of depending skirt portions 32, the skirt portions 32 flaring at an angle corresponding to the flare of the side walls of the horn so as to provide an interior recess which will neatly receive the upper terminal of the horn beyond the point 28. The apertures 31 are arranged so as to align with the inlet openings 27 of the compartments, and are preferably of corresponding shape. The cap-piece may be made up either as an integral structure or by a number of plates which are welded or brazed together in order to produce the desired form. Securely fixed within each of the openings 31 is a sound-conveying tube 33 which has operatively associated therewith at its upper end an electric sound-reproducer or loud speaker unit such as shown at 34, each of the tubes 33 being equipped with a corresponding loud speaker unit.

The sound-projecting horn is bodily suspended within the body of the fuselage with its longitudinal axis vertically disposed, preferably by arranging the lowest strengthening rib 25 so as to rest directly upon a pair of spaced longerons 4, in a manner which is clearly shown in Figs. 2 and 3. These ribs may be suitably clamped to the longerons in any desired manner, and the body of the horn may be likewise additionally supported and braced by cross members which are attached to the horn and to the framework of the fuselage. The lower discharge end of the horn opens directly through the bottom of the fuselage, and it is preferred to fashion the sheathing 6 so that the portions thereof such as shown at 6' when inturned at the discharge end of the horn will form a substantial continuation of the side walls of the horn. The inturned portions 6' in this manner, not only aid in increasing the effective length of the sound-projecting horn but may also more conveniently serve as a sealing means to prevent the entry of objectionable air currents into the interior of the fuselage at this region.

The conductors forming the output side of the amplifier unit 8 lead directly to the several loud speaker units 34, each of the several loud speaker units being electrically connected therewith in a manner indicated in Fig. 1 of the drawings. In this manner, the several loud speaker units are caused to operate in synchronism, and if the loud speaker units are properly selected the arrangement of the several compartments in the manner described will in effect serve as a single sound-projecting horn of great capacity.

As shown in the drawings, the upper reduced end of the sound projecting horn, the cap-piece 29 and the several loud speaker units carried thereby project slightly above the main body of the fuselage. In order to thoroughly protect these parts, the sheathing at that portion of the body is extended thereover in the manner indicated at 35, the enclosure thus formed being preferably made stream-line to prevent excessive wind resistance and consequent loss in aerodynamical efficiency, all as will be obvious to those familiar with this art.

In order to project sounds of sufficient intensity and volume for practical purposes from the sound-projecting horn, in an apparatus such as described, it becomes necessary to employ extremely high potentials for operating the plate circuits of the amplifier unit 8, and which will subsequently be described more in detail. If storage batteries, or similar apparatus were used as a source of the electrical supply, it is apparent that it would be necessary to carry a large number of batteries, thus adding greatly to the total weight of the installation. For this reason but a single set of storage batteries 9 are used which are employed for supplying the necessarily low potential for the filament circuits, while the high potential source is derived by means of a dynamotor 10, the input side of which is connected to the set of storage batteries, and the output side thereof directly to the plate circuits. In this manner, the total weight of the amplifier unit proper is greatly reduced, making the installation practical for the desired purpose, while at the same time eliminating much inconvience which would necessarily be encountered in some localities due to a lack of suitable recharging facilities for the batteries.

The coordination between the single set of storage batteries employed, the dynamotor, and the amplifier unit proper is clearly indicated by Fig. 1 when taken in conjunction with the wiring diagram shown in Fig. 6. The conductors 12, 12' from the storage battery are directly connected to the circuits which supply the filaments of the several audion tubes 40, 41, 42 and 43, a rheostat 44 serving as a means for regulating the supply to the audions 40 and 41 while the rheostat 45 serves a similar purpose for the audions 42 and 43. For convenience, a cut-out switch 46 is interposed in the conductor 12, and is preferably located closely adjacent the amplifier unit 8 so as to be readily controlled by means of the operator positioned within the cock pit 3. The conductors 13, 13', for supplying the dynamotor are connected to the conductors 12 and 12' in advance of this switch so that energy is cut off from both the filament circuits and the dynamotor when the switch is open. The conductors 14, 14' forming the output of the dynamotor furnish the energy for the several plate circuits, the voltage of which may be conveniently controlled by means of the series of adjustable resistances indicated at 47. As shown, these conductors have associated therewith the filter circuits indicated at 14''. The conductors 11, 11' from the microphone lead to a microphone transformer shown at 48 which may be of any approved construction, the secondary winding of which has associated therewith the audion 40 forming the first stage of the amplifier unit, the second stage being formed by the audion 41 and the third stage by the so-called push-pull power stage comprising the audions 42 and 43, the intake side of the push-pull power stage including the transformer indicated at 49 and its output including the transformer at 50 all of which will be readily understood by those familiar with this art. Since the association of the several parts and the wiring employed in the amplifier unit proper, as shown in Fig. 6, and other than in respect to the potentials and special values employed to secure the desired results in the particular system described, corresponds to well known practice in this art, it will not be necessary to describe the construction and operation thereof in greater detail, the several parts and their coordination being clearly indicated in the drawings.

From the above by arranging the several parts of the entire system in the manner described, and by using proper values in order to effectively operate the several loud speaker units 34 so as to assure reproduction of the desired sounds with sufficient intensity and volume, it will be apparent that any sounds transmitted into the system by means of the microphone 7 will be magnified and emitted at projecting horn 16, in such fashion as to be readily heard by an audience located upon the earth, and at a great distance below the aeroplane equipped with the invention, it being understood that suitable means are provided for controlling the degree of amplification. Although the installation has been primarily intended for the projection of the human voice, by having the speaker direct his voice into the receiving end of the system, it is also contemplated projecting sounds of any desired character in a similar fashion, if found desirable. It is apparent that the invention will readily lend itself to many uses such as the giving of public addresses, aviation lectures which may be illustrated by suitable auxiliary apparatus operated from the aircraft from which the lecture is given, news dispatches, advertising announcements, as well as for the purpose of directing operations upon the earth either during war or peace by projecting the necessary commands from the aircraft. While a number of uses to which the invention may be put have been mentioned, it is in no way intended to limit it to these fields, since it is obviously adapted for innumerable uses in which it may be found necessary or desirable to transmit audible sounds from a height above the earth's surface downwardly to an audience, large or small located upon the earth's surface, and it is likewise not intended to limit the invention to aeroplanes since it is obviously adapted for use in connection with other types of aircraft, such as balloons, kites, and dirigibles.

As required by the patent statutes, the preferred embodiment of the invention has been illustrated and described. It is obvious, however, that many changes may be made both in details and in the arrangement of the several parts, without departing from the spirit of the invention, and it is therefore not intended to limit the invention beyond that particularly defined by the appended claims.

We claim:

1. The combination of an aircraft having a body comprising longerons and a sheathing, a sound-projecting horn mounted within said aircraft, said horn being suspended within the said body and resting at its lower discharge end upon spaced apart longerons, the said discharge end of the horn opening through the bottom of said body, and the said sheathing adjacent the discharge end of the horn forming a substantial continuation of the sides thereof.

2. The combination of an aircraft having a body comprising longerons and a sheathing, a sound-projecting horn mounted within said aircraft, said horn being disposed with its longitudinal axis substantially vertical to said body and supported upon spaced-apart longerons, the discharge end of the horn opening through the bottom of said body, and the inner wall surface of the horn being continuous with the outer surface of said aircraft body.

3. A sound projecting horn comprising four similarly shaped trapezoidal walls secured to each other at their adjacent edges to form a tubular body, partitions disposed within the interior of the body dividing it into a plurality of similar compartments, a cap piece rigidly secured to the smaller end of the body and provided with openings extending therethrough and communicating with each of said compartments, and a sound conveying tube secured in each of said openings.

4. A sound amplifying horn comprising a plurality of similar compartments, a cap-piece surmounting one end of the horn provided with openings in alignment with the respective compartments, a tube fitted into each of said openings, and a sound reproducer associated with each of said tubes.

In testimony whereof, we hereunto sign our names.

SAMUEL E. ADAIR.
BERNARD KNAPP.